United States Patent
Kuroda

(10) Patent No.: US 7,300,089 B2
(45) Date of Patent: Nov. 27, 2007

(54) FIXING MEMBER AND A FIXING STRUCTURE FOR VEHICLE PART

(75) Inventor: Takeshi Kuroda, Kanagawa (JP)

(73) Assignee: Piolax Inc., Yokohama-shi, Kanagawa-ken (JP)

( * ) Notice: Subject to any disclaimer, the term of this patent is extended or adjusted under 35 U.S.C. 154(b) by 117 days.

(21) Appl. No.: 10/957,741

(22) Filed: Oct. 5, 2004

(65) Prior Publication Data

US 2005/0116485 A1 Jun. 2, 2005

Related U.S. Application Data

(63) Continuation-in-part of application No. 29/206,457, filed on Jun. 1, 2004, now Pat. No. Des. 529,793.

(30) Foreign Application Priority Data

Oct. 6, 2003 (JP) ............... 2003-029231
Oct. 6, 2003 (JP) ............... 2003-029232

(51) Int. Cl.
*B60R 13/01* (2006.01)
*F16B 13/04* (2006.01)

(52) U.S. Cl. .............. 296/39.1; 296/214; 411/45; 24/297

(58) Field of Classification Search ........... 296/39.1, 296/214, 187.05; 411/45–48; 24/297
See application file for complete search history.

(56) References Cited

U.S. PATENT DOCUMENTS

2003/0079316 A1* 5/2003 Ogawa .................... 24/297
2003/0200634 A1* 10/2003 Hansen .................... 24/297

FOREIGN PATENT DOCUMENTS

| JP | D821624 | 11/1991 |
|---|---|---|
| JP | D825511 | 12/1991 |
| JP | D825511 | 8/1992 |
| JP | D931930 | 8/1995 |
| JP | D994532 | 11/1997 |
| JP | 2585835 | 9/1998 |
| JP | 2979079 | 9/1999 |
| JP | D1052869 | 10/1999 |
| JP | D1052870 | 10/1999 |
| JP | D1052871 | 10/1999 |
| JP | D1067403 | 4/2000 |
| JP | D1052869 | 7/2000 |

(Continued)

*Primary Examiner*—Joseph D. Pape
(74) *Attorney, Agent, or Firm*—McGinn IP Law Group, PLLC

(57) ABSTRACT

A fixing member includes a base portion having an opening portion at side surfaces thereof, a pair of flange portions protruding from a free end portion of the base portion, at least one elastic portion perpendicularly extending from a lower surface of each flange portion toward within the opening portion of the base portion, and at least one pair of engagement portions protruding from inner surfaces of the base portion. The inner surfaces of the base portion are opposed to each other. When the fixing member for fixing car interior material to a vehicle body is engaged with a boss member, the elastic portion presses against both sides of the boss portion by its distal end portion of the elastic portion.

8 Claims, 12 Drawing Sheets

FOREIGN PATENT DOCUMENTS

| | | |
|---|---|---|
| JP | D1052870 | 7/2000 |
| JP | D1052871 | 7/2000 |
| JP | 2000-249117 | 9/2000 |
| JP | D1100983 | 2/2001 |
| JP | D1100984 | 2/2001 |
| JP | D1101193 | 2/2001 |
| JP | D1101194 | 2/2001 |
| JP | D1101195 | 2/2001 |

* cited by examiner

FIXING MEMBER AND A FIXING STRUCTURE FOR VEHICLE PART

The present Application is a Continuation-in-Part of U.S. Design Patent Application No. 29/206,457 filed on Jun. 1, 2004 now U.S. Pat. No. D,529,793.

BACKGROUND OF THE INVENTION

1. Field of the Invention

The present invention relates to a fixing structure and a fixing member (hereinafter referred to as a clip) for attaching a vehicle part such as a garnish for a car (hereinafter referred to as an interior material) to a vehicle body.

2. Description of the Related Art

A conventional fixing structure of this type has been so constructed that a plurality of boss members are integrally provided so as to protrude from a back face of a car interior material, and the boss members are individually engaged with attaching holes formed in a vehicle body by clips, thereby to attach the car interior material to the vehicle body by one-touch operation. The clip employed in a first example of the conventional fixing structure includes a U-shaped main body, and a pair of flanges respectively provided continuously from opening end edges of the U-shaped main body which are opposed to each other. Moreover, a pair of elastic locking legs extending upwardly and outwardly from below are provided in center parts of both side walls which define the U-shaped main body, and a pair of reverse retaining claws extending diagonally downwardly are respectively formed on bent parts of the flanges (For example, Japanese Patent Publication No. 2979079).

Therefore, when the car interior material is actually attached to the vehicle body under this first fixing structure, the boss member of the car interior material is inserted into the U-shaped main body of the clip, as a first step, so that the aforesaid pair of reverse retaining claws may bite the boss member from both sides. Then, the clip in this state is inserted into an attaching hole which has been formed in the vehicle body, and the aforesaid pair of elastic locking legs pass the attaching hole while they are inwardly flexed, thereby permitting their own inclined shoulders which project outwardly to be elastically engaged with a hole edge of the attaching hole. In this manner, the car interior material can be attached to the vehicle body.

The clip employed in a second fixing conventional structure includes essentially a U-shaped main body, and a pair of flanges respectively provided continuously from opening end edges of the U-shaped main body which are opposed to each other, in the same manner. While a pair of elastic locking legs extending upwardly and outwardly from below are provided in center parts of both side walls which define the U-shaped main body, a pair of reverse retaining claws extending diagonally downwardly are respectively formed on bent parts of the flanges. In addition, another pair of reverse retaining claws extending diagonally downwardly are also provided on lower end edges of the aforesaid elastic locking legs (For example, Japanese Utility Model Registration Publication No. 2585835).

Therefore, when the car interior material is actually attached to the vehicle body under this second fixing structure, the boss member of the car interior material is also inserted into the U-shaped main body of the clip so that the upper and lower pairs of reverse retaining claws may bite the boss member from both sides. Then, the clip in this state is inserted into the attaching hole which has been formed in the vehicle body, and the aforesaid pair of elastic locking legs pass the attaching hole while they are inwardly flexed, thereby permitting their own inclined shoulders which project outwardly to be elastically engaged with the hole edge of the attaching hole. In this manner, the car interior material can be attached to the vehicle body.

Further, the clip employed in a third fixing conventional structure is different from the above described structures. The third fixing structure includes a U-shaped main body and a pair of locking pieces erected continuously from both sides of the U-shaped main body. A pair of engaging protrusions inwardly projecting are formed at respective opening end edges of the U-shaped main body which are opposed to each other, and a pair of inclined shoulders projecting outwardly are integrally formed on respective outer faces of the locking pieces (For example, JP-A-2000-249117).

Therefore, when the car interior material is actually attached to the vehicle body under this third fixing structure, the boss member of the car interior material is also inserted into the U-shaped main body of the clip. However, in this case, the engaging protrusions formed on the opening end edges of the U-shaped main body are engaged with engaging holes which have been formed in the boss member. Then, the clip in this state is inserted into the attaching hole which has been formed in the vehicle body, and this time, the aforesaid locking pieces pass the attaching hole while they are inwardly flexed, thereby permitting the inclined shoulders formed on their outer faces to be elastically engaged with the hole edge of the attaching hole. In this manner, the car interior material can be attached to the vehicle body.

SUMMARY OF THE INVENTION

Among the car interior materials, a cover or the like to be attached to an upper face of a dashboard, for example, is not so frequently attached or detached, and requires a large anti-detaching force in order to prevent distortion or thermal expansion when it has received direct sunlight. On the other hand, the cover or the like to be attached to an instrument panel which is not exposed to the direct sunlight should be frequently attached or detached for the purpose of exchanging a car radio or an audio apparatus, and so, requires easiness of attaching or detaching rather than the anti-detaching force. Accordingly, for the fixing structure to be used in such cases, the anti-detaching forces suitable for individual cases are strictly required.

However, in the clip of the first conventional fixing structure, the elastic locking legs to be locked to the hole edge of the attaching hole in the vehicle body and the reverse retaining claws to bite into the boss member of the car interior material functions independently from each other. Therefore, even though a manufacturer tries to control locking forces of the elastic locking legs with respect to the attaching hole by varying a thickness of the boss member, the locking forces with respect to the attaching hole are not at all change. In order to control the anti-detaching force, it has been necessary to prepare a plurality of types of the clips, and to select the clips suitable for individual cases on every occasion of use.

Moreover, in the clip of the second fixing conventional structure, although the reverse retaining claws are formed also at the lower end edges of the elastic locking legs to be engaged with the hole edge of the attaching hole of the vehicle panel, the elastic locking legs themselves are integrally formed with the U-shaped main body, and therefore, a locked state of the elastic locking legs with respect to the hole edge of the attaching hole will hardly change, even though the thickness of the boss member has been varied. For this reason, in order to control the anti-detaching force in actual use, it has been also necessary to prepare a plurality of types of the clips, and to select the clips suitable for individual cases on every occasion of use.

Further, in the clip of the third fixing conventional structure, in case where the thickness of the boss member has been made larger, both the side walls defining the U-shaped main body are be spread, and the engaging protrusions will be disengaged from the engaging holes of the boss member. Consequently, it has become impossible to control the anti-detaching force by varying the thickness of the boss member. Besides, the locking pieces themselves will be also spread outwardly according to the thickness, and it has been concerned that insertion force of the clip with respect to the attaching hole of the vehicle body may undesirably increase, making the clip unusable.

[Means for Solving the Problems]

This invention has been made in order to solve the above described problems of the conventional fixing structures. In a first aspect of the invention, there is provided a fixing structure for a car interior material which fixes the car interior material to a vehicle body, by engaging a boss member projected from a back face of a vehicle part (for example, the car interior material) with an attaching hole formed in the vehicle body, by a fixing member (hereinafter referred to as a clip), characterized in that the aforesaid clip includes a U-shaped base portion (hereinafter referred to as a U-shaped main body), and a pair of flange portions (hereinafter referred to as flanges) continuously provided from respective opening end edges of the U-shaped main body, the U-shaped main body being provided, in center parts of both side walls thereof which define the U-shape, with a pair of elastic portions (hereinafter referred to as elastic locking legs) of which base ends are integrally suspended from the aforesaid flanges and lower ends are free ends, and also provided with engaging claws (hereinafter referred to engaging protrusions) on inner faces of both the side walls where the elastic locking legs are not provided, wherein respective outer faces of the elastic locking legs are formed in an outwardly protruded shape (hereinafter referred to as inclined shoulders) so as to be locked to a hole edge of the attaching hole of the aforesaid vehicle body, and the boss member of the car interior material is provided with engaging recesses which are adapted to be engaged with the aforesaid engaging protrusions.

In a second aspect of the invention, there is a fixing structure for a car interior material which fixes the car interior material to a vehicle body, by engaging a boss member formed on a back face of the car interior material with an attaching hole formed in the vehicle body, by a clip, characterized in that the aforesaid clip includes a U-shaped main body, and a flange continuously provided from one of opening end edges of the U-shaped main body, the U-shaped main body being provided, in a center part of one of side walls thereof which define the U-shape, with an elastic locking leg of which a base end is integrally suspended from the aforesaid flange and a lower end is a free end, and also provided with engaging protrusions opposed to each other, respectively on an inner face of the one side wall where the elastic locking leg is not provided and on a corresponding inner face of the other side wall, wherein an inclined shoulder is formed on an outer face of the elastic locking leg in an outwardly protruded shape so as to be locked to a hole edge of the attaching hole of the aforesaid vehicle body, and the boss member of the car interior material is provided with engaging recesses which are adapted to be engaged with the aforesaid engaging protrusions.

In a third aspect of the invention, on the premise of the above described first and second aspects, the fixing structure is characterized in that a center line of a thickness of the elastic locking leg is outwardly curved.

In a fourth aspect of the invention, on the premise of the above described first and second aspects, the fixing structure is characterized in that an outer edge of the lower end of the elastic locking leg, which is a free end, is positioned inwardly than an outer face of the side wall which defines the U-shaped main body.

In a fifth aspect of the invention, on the premise of the above described first and second aspects, the fixing structure is characterized in that an inner edge of the lower end of the elastic locking leg, which is a free end, is positioned inwardly than an inner face of the side wall which defines the U-shaped main body.

In a sixth aspect of the invention, on the premise of the above described first and second aspects, the fixing structure is characterized in that the engaging protrusions are formed on both sides of the side walls which define the U-shaped main body, and are engaged with the corresponding engaging recesses at four corners of both faces of the boss member of the car interior material.

In a seventh aspect of the invention, on the premise of the above described first and second aspects, the fixing structure is characterized in that the car interior material has a plurality of the boss members, and a thickness of a portion of the boss member which the lower end of the elastic locking leg is contacted with is larger in one of the boss members than in the other boss members.

In an eighth aspect of the invention, on the premise of the above described first and second aspects, the fixing structure is characterized in that there are a plurality of the car interior materials, and a thickness of a portion of the boss member which the lower end of the elastic locking leg is contacted with, in one of the car interior materials, is larger than a thickness of a portion of the boss member which the lower end of the elastic locking leg is contacted with, in the other car interior materials.

Accordingly, in the above described first aspect, when the lower ends of the pair of the elastic locking legs which are provided in the center parts of both the side walls defining the U-shaped main body have come into contact with both the faces of the boss member of the car interior material, the elastic locking legs detect the thickness of the contact portion, thereby to change opening angles of their inclined shoulders. In this manner, locking force of the inclined shoulders with respect to the hole edge of the attaching hole can be controlled according to the thickness of the contact portion of the boss member. Therefore, by simply varying the thickness of the portion which the lower ends of the elastic locking legs of the boss member are adapted to be contacted with, the necessary anti-detaching force can be obtained, and hence, co-use of the clip itself can be expected.

In the above described second aspect, when the lower end of the elastic locking leg which is provided in the center part of one of the side walls defining the U-shaped main body has come into contact with the boss member of the car interior material, the elastic locking leg detects the thickness of the contact portion, and changes an opening angle of the inclined shoulder thereof. In this manner, locking force of the inclined shoulder with respect to the hole edge of the attaching hole can be controlled according to the thickness of the contact portion of the boss member. Therefore, by simply varying the thickness of the portion which the lower end of the elastic locking leg of the boss member is adapted to be contacted with in the same manner, the necessary anti-detaching force can be obtained, and hence, co-use of the clip itself can be expected.

In the above described third aspect, because the center line of the thickness of the elastic locking leg is outwardly curved, when the clip is inserted into the attaching hole, the elastic locking leg is pressed by the hole edge of the attaching hole thereby to extend the lower end thereof, which is the free end, downwardly, while it is deformed from the curved shape into a rectilinear shape. In this manner, irrespective of the thickness of the boss member, insertion performance with respect to the attaching hole can be highly enhanced.

In the above described fourth aspect, because the outer edge of the lower end of the elastic locking leg is positioned inwardly than the outer face of the side wall of the U-shaped main body, inserting operation of the elastic locking leg into the attaching hole can be conducted smoothly, and the elastic locking leg will not be accidentally rolled up.

In the above described fifth aspect, because the inner edge of the lower end of the elastic locking leg is positioned inwardly than the inner face of the side wall of the U-shaped main body, it has become possible to deal with the boss member having a small thickness, and a scope of use can be enlarged.

In the above described sixth aspect, because the engaging protrusions are formed on both sides of the side walls of the U-shaped main body, and are engaged with the corresponding engaging recesses at the four corners of both the faces of the boss member, the clip can be fitted to the boss member in a stabilized and rigid state.

In the above described seventh aspect, among a plurality of the boss members provided on the back face of the car interior material, even though the thickness of the portion which the lower end of the elastic locking leg is contacted with is larger or smaller, it has become possible to use the clip which is common to both the cases, without using an exclusive clip on every occasion. Therefore, improvement in operability will be highly expected.

In the above described eighth aspect, even though the portions of the boss members provided on the back faces of a plurality of the car interior materials which the lower ends of the elastic locking legs are contacted with have the larger or smaller thicknesses in the respective car interior materials, it has become possible to use the clip which is common to both the cases, without using an exclusive clip on every occasion. Therefore, in this case too, improvement in operability will be highly expected.

DESCRIPTION OF THE PREFERRED EMBODIMENTS

An aspect of the invention is to provide a pair of elastic locking legs of which base ends are integrally suspended from flanges and lower ends are free ends, in center parts of at least one of side walls defining a U-shaped main body, wherein when the lower ends of the elastic locking legs have come into contact with a boss member of a car interior material, the elastic locking legs detect a thickness of the contact portion thereby to change opening angles of inclined shoulders thereof, whereby locking force of the inclined shoulders of the elastic locking legs with respect to a hole edge of an attaching hole can be controlled.

First Embodiment

Figure 1:
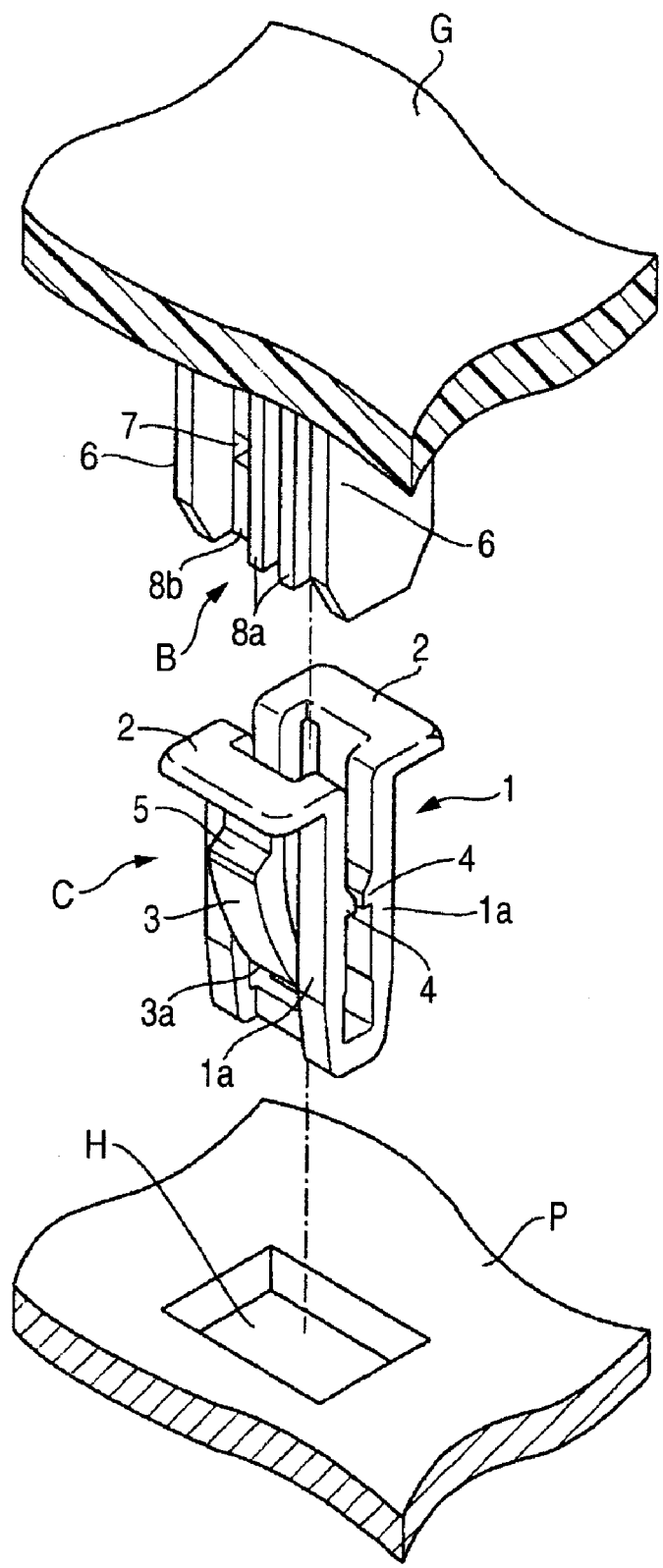
FIG. 1 is an exploded perspective view of an essential part showing a fixing structure according to a first embodiment of the invention.

Now, the invention will be described in detail, referring to the drawings illustrating preferred embodiments of the invention. As shown in FIG. 1, a fixing structure according to a first embodiment also includes a plurality of boss members B which are integrally formed on a vehicle part G such as a garnish (hereinafter referred to as a car interior material, as an example), in the same manner as the conventional structure. The fixing structure has been developed for the purpose of attaching the car interior material G to a vehicle panel P, by individually locking the boss members B to attaching holes H which have been formed in the vehicle panel P, by fixing members C (hereinafter referred to as clips). Characteristic feature of the invention lies in that the following structure has been adopted.

Figure 2A:
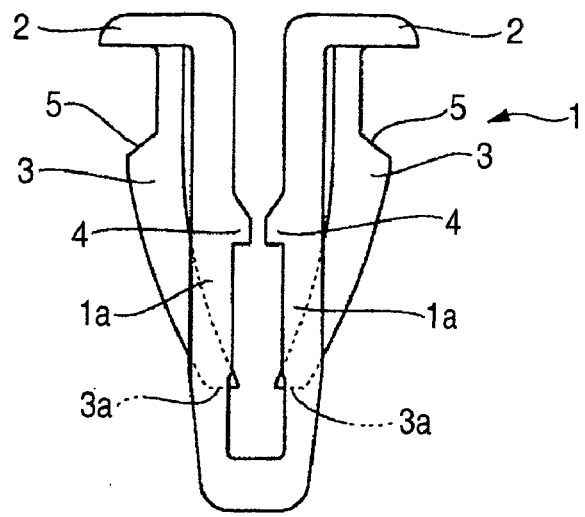
FIG. 2(A) is a front view of a clip employed in the first embodiment, and (B) is a side view of the same.
Figure 2B:
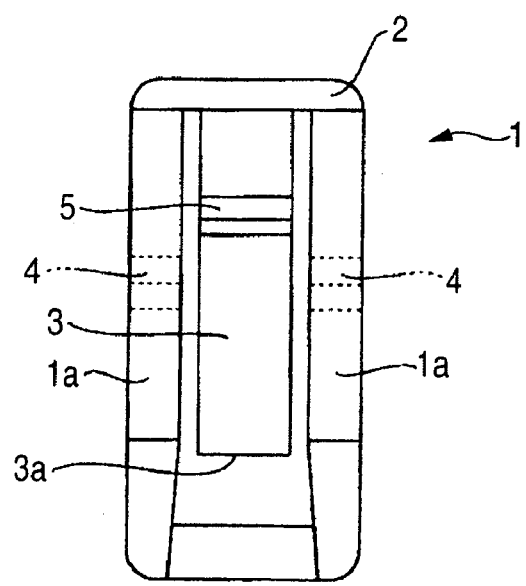
Figure 3A:
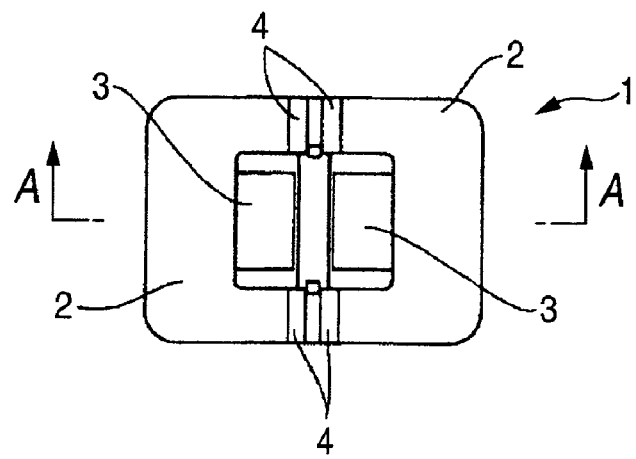
FIG. 3(A) is a plan view of the clip employed in the first embodiment, and (B) is a sectional view taken along a line A-A in FIG. 3(A).
Figure 3B:
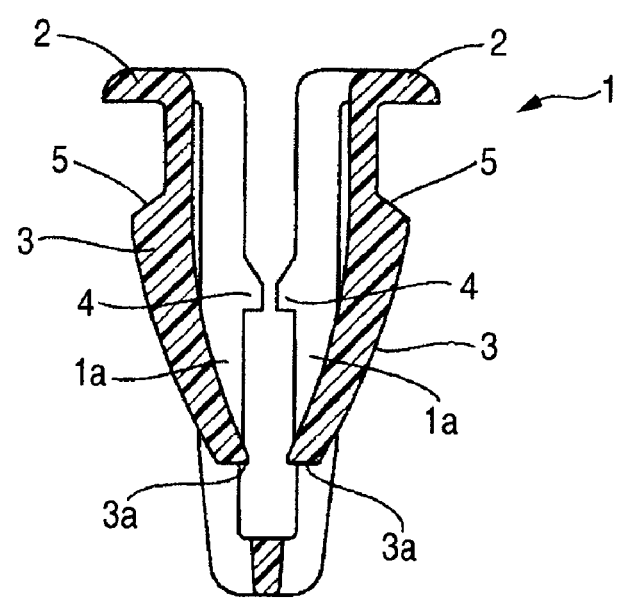

First of all, the clip C will be described. The clip C is an integral product of synthetic resin, and has a U-shaped base portion 1 (hereinafter referred to as a U-shaped main body) and a pair of flange portions 2 (hereinafter referred to as flanges 2) which are provided continuously from respective opening end edges of the U-shaped main body 1 and extend in directions away from each other, as shown in FIGS. 2 and 3. The U-shaped main body is provided with a pair of elastic portions 3 (hereinafter referred to as elastic locking legs 3) of which base ends are suspended integrally from respective lower faces of the aforesaid flanges 2 and lower ends 3a are free ends, in center parts of both side walls 1a which define its U-shape, separately from the side walls 1a. At the same time, both the sidewalls 1a are provided, on their inner faces where the elastic locking legs 3 are not provided, with four engaging protrusions 4 opposed to each other and adapted to be engaged with engaging holes 7 of the boss member B, which will be described below.

Outer faces of upper parts of the above described pair of the elastic locking legs 3 are formed in an outwardly projected shape (hereinafter referred to as inclined shoulders 5) so as to be elastically engaged with a hole edge of the attaching hole H of the vehicle panel P. An outwardly curved shape is positively given to both the outer faces of the elastic locking legs 3 continued from the inclined shoulders 5 and their inner faces continued from the flanges 2, whereby center lines of thickness between the outer and inner faces are curved outwardly. In addition, the lower ends 3a which are the free ends opposed to each other interposing a narrow space have a function of automatically detecting a thickness of a contact portion 8a of the boss member B, which will be described below. Outer edges of the lower ends 3a are positioned inwardly than outer faces of the side walls 1a which define the U-shaped main body 1, and inner edges of the lower ends 3a are positioned inwardly than inner faces of the side walls 1a which define the U-shaped main body 1.

Each of the boss members B of the car interior material G is in a plate-like shape and has wide guide walls 6 on both side ends so that the clip C can be fitted between the guide walls 6. The boss member B is provided with the two engaging holes 7 at both sides corresponding to the aforesaid engaging protrusions 4 which are opposed to each other. It is so constructed that the thickness of the contact portions 8a which the lower ends 3a of the elastic locking legs 3 are contacted with can be varied, as desired, according to required anti-detaching force.

Figure 4A:
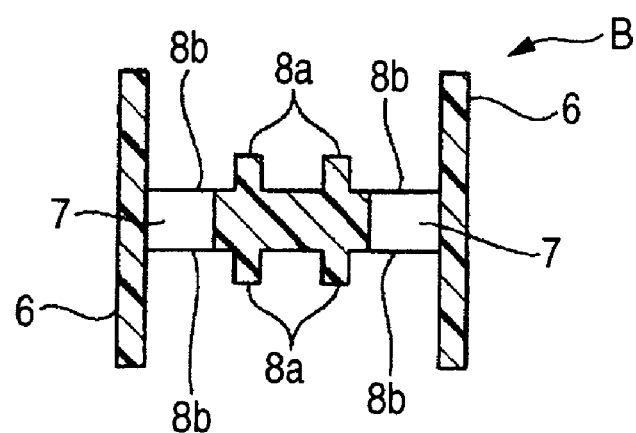
FIG. 4(A) is a cross-sectional view of a boss member having a contact portion of a large thickness, and (B) is a cross-sectional view of the boss member having the contact portion of a small thickness.
Figure 4B:
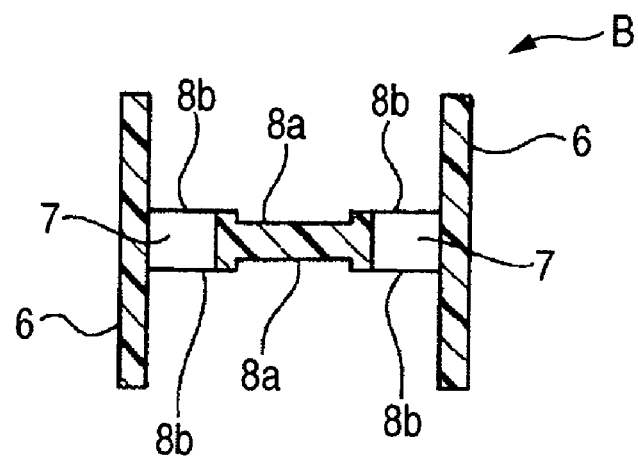

Specifically, in case of the boss member B provided on the car interior material G which requires the large anti-detaching force, the thickness of the contact portions 8a is made larger than that of portions 8b where the engaging holes 7 are formed, as shown in FIGS. 1 and 4A. On the other hand, in case of the boss member B provided on the car interior material G which requires easiness of attaching or detaching rather than the anti-detaching force, the thickness of the contact portions 8a is made smaller than that of the portions 8b where the engaging holes 7 are formed, as shown in FIG. 4B. Then, by making the lower ends 3a of a pair of the elastic locking legs 3 detect the thickness of these contact portions 8a from both sides of the boss member B, opening angles of the inclined shoulders 5 of the elastic locking legs 3 are changed. In this manner, it has become possible to control the locking force of the inclined shoulders 5 of the elastic locking legs 3 with respect to the hole edge of the attaching hole H, according to the thickness of the contact portions 8a of the boss member B. It is to be noted that even in the boss member B in which the contact portions 8a have different thickness, the thickness of the portions 8b at the both sides which are not provided with the engaging holes 7 should be set to be the same size, in either case.

Figure 5:
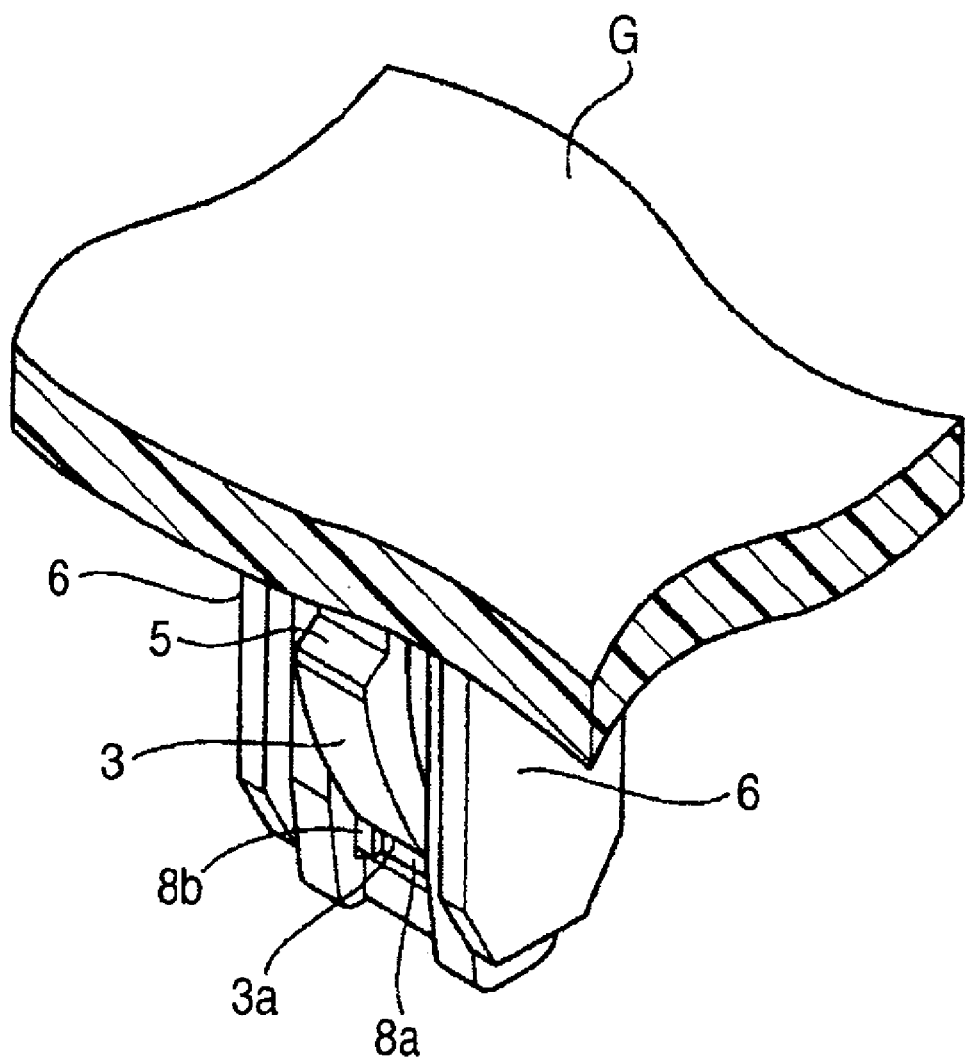
FIG. 5 is a perspective view of an essential part in which the clip has been fitted to the boss member of a car interior material.

Therefore, in case where the car interior material G which requires the easiness of attaching or detaching rather than the anti-detaching force is attached to the vehicle panel P, the car interior material G is provided on its back face with the boss member B in which the contact portions 8a have the smaller thickness than the portions 8b provided with the aforesaid engaging holes 7. Accordingly, as shown in FIG. 5, when the boss member B having the contact portions 8a of the smaller thickness is inserted into the U-shaped main body 1 of the clip C, the four engaging protrusions 4 are engaged with the engaging holes 7 from both sides, thereby to rigidly fix the clip C itself to the boss member B in a stabilized manner. At the same time, the lower ends 3a of the pair of the elastic locking legs 3 come into contact with the thin-walled contact portions 8a of the boss member B from both sides, and detect the thickness of the contact portions 8a. In this case, the opening angles of the inclined shoulders 5 of the elastic locking legs 3 will not be changed so much, since the thickness of the contact portions 8a is small.

Figure 6:
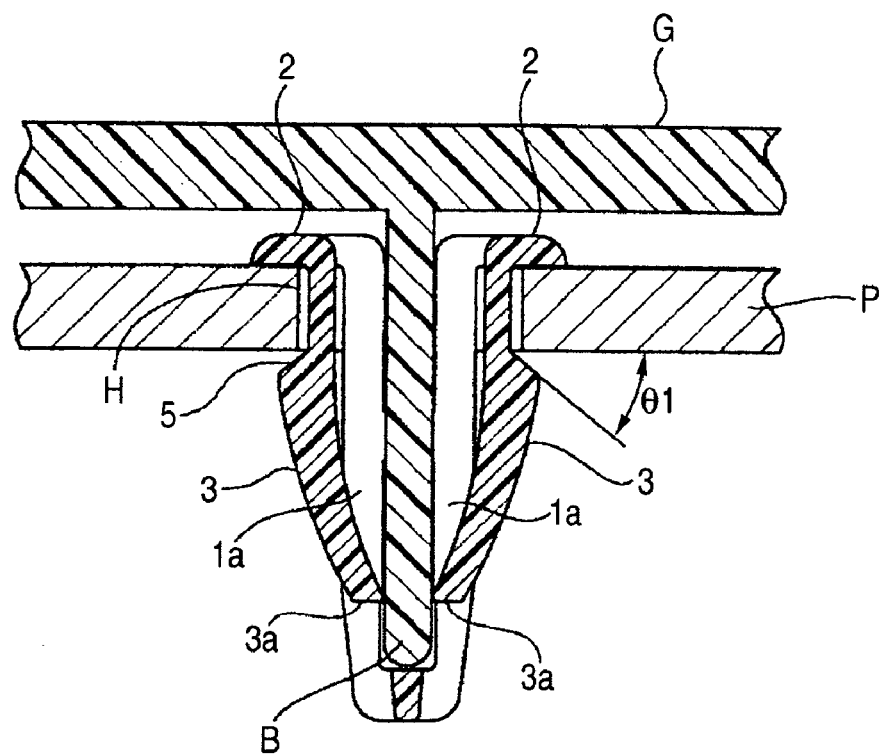
FIG. 6 is a sectional view showing the fixing structure in a state where the car interior material having the boss member of the small thickness has been fixed to a vehicle panel.

Thereafter, the clip C in this state is inserted into the attaching hole H in the vehicle panel P, while the pair of the elastic locking legs 3 are inwardly flexed, and the hole edge of the attaching hole H will be elastically locked to the inclined shoulders 5 of the elastic locking legs 3, as shown in FIG. 6. In this manner, the car interior material G can be fixed to the vehicle panel P by one-touch operation. Particularly, in this case, the opening angle θ 1 of the inclined shoulders 5 of the elastic locking legs 3 is not so largely changed because the contact portions 8a of the boss member B have the small thickness, and the elastic locking legs 3 will be locked to the hole edge of the attaching hole H at a relatively large opening angle, without taking a rigidly locked state. Consequently, in case where necessity of detaching the car interior material G from the vehicle panel P has happened, it is possible to easily detach the car interior material G from the vehicle panel P without damaging the clip, by forcibly withdrawing the boss member B together with the clip C from the attaching hole H.

Moreover, on occasion of inserting the clip C into the attaching hole H of the vehicle panel P, because the outer edges of the lower ends 3a of the elastic locking legs 3 are positioned inwardly than the outer faces of the side walls 1a defining the U-shaped main body 1, as described above, inserting operation of the elastic locking legs 3 into the attaching hole H can be smoothly conducted, and the elastic locking legs 3 will not be accidentally rolled up, in touch with the hole edge of the attaching hole H. Further, because the inner edges of the lower ends 3a of the elastic locking legs 3 are positioned inwardly than the inner faces of the side walls 1a defining the U-shaped main body 1, even the boss member B having the smaller thickness than the space between both the side walls 1a defining the U-shaped main body 1 can be dealt with due to this positional relation, and therefore, a scope of use can be enlarged.

On the contrary, in case where the car interior material G which requires the large anti-detaching force is attached to the vehicle panel P, the car interior material G is provided on its back face with the boss member B in which the contact portions 8a have the larger thickness than the portions 8b provided with the aforesaid engaging holes 7. Accordingly, when this boss member B in which the contact portions 8a have the larger thickness is inserted into the U-shaped main body 1 of the clip C, the four engaging protrusions 4 are engaged with the engaging holes 7 from the both sides, thereby to rigidly fix the clip C itself to the boss member B in a stabilized manner. At the same time, the lower ends 3a of the pair of the elastic locking legs 3 come into contact with the thick-walled contact portions 8a of the boss member B from the both sides, and detect the thickness of the contact portions 8a. In this case, the opening angle of the inclined shoulders 5 of the elastic locking legs 3 will be changed, because the thickness of the contact portions 8a is large, and consequently, the elastic locking legs 3 will be lifted upwardly.

Figure 7:
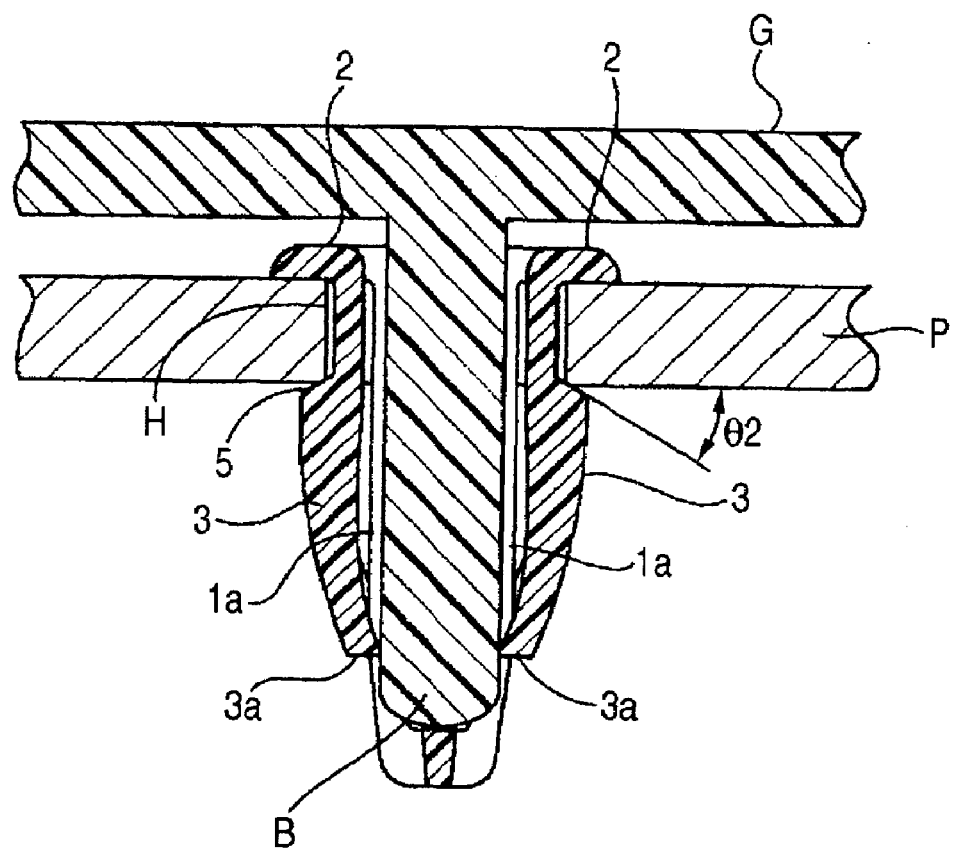
FIG. 7 is a sectional view showing the fixing structure in a state where the car interior material having the boss member of the large thickness has been fixed to the vehicle panel.

Thereafter, the clip C in this state is also inserted into the attaching hole H in the vehicle panel P, while the pair of the elastic locking legs 3 are inwardly flexed, and the hole edge of the attaching hole H will be elastically locked to the inclined shoulders 5 of the elastic locking legs 3, as shown in FIG. 7. In this manner, the car interior material G can be fixed to the vehicle panel P by one-touch operation. Particularly, in this case, the opening angle θ 2 of the inclined shoulders 5 of the elastic locking legs 3 will be changed nearly to a right angle, because the contact portions 8a of the boss member B have the large thickness, and the elastic locking legs 3 will be locked to the hole edge of the attaching hole H at a relatively small opening angle, whereby a rigidly locked state can be obtained. Consequently, even though a man tries to detach the car interior material G from the vehicle panel P, it is extremely difficult to detach it from the vehicle panel P, and the large anti-detaching force can be obtained.

Therefore, under the fixing structure according to the first embodiment, by simply varying the thickness of the boss member B of the car interior material G, while the clip C itself is co-used, it is possible to provide, as desired, the anti-detaching force which is required by the car interior material G to be attached. As the results, there will be no necessity of preparing a plurality of types of the clips C according to the anti-detaching forces required by the car interior material G to be attached, as in the prior art, and the fixing structure will be highly economical.

Although the above embodiment has been described based on the premise that the boss members B having the contact portions 8a of the same thickness are provided on a sheet of the car interior material G, the invention is not limited to this embodiment. For example, even in case where the boss members B having the thin walled contact portions 8a and the boss members B having the thick walled contact portions 8a are juxtaposed on a sheet of the car interior material G, it is needless to say, of course, that the fixing structure according to the invention can be used. Particularly in this case, it is not necessary to select and use the clips C individually, according to the thickness of the contact portions 8a, as in the prior art. Therefore, fixing operation of the clip C itself as well as its handling operation will be extensively improved.

Moreover, in the first embodiment, in order that the center line of the thickness of each of the elastic locking legs 3 of the clip C employed in this embodiment may be outwardly curved, the outwardly curved shape has been given to the outer face continued from the inclined shoulder 5 and the inner face continued from the flange 2. Therefore, in contrast with the elastic locking leg having rectilinear lines on the inner and outer faces thereof, this elastic locking leg can offer remarkable effects in inserting performance with respect to the attaching hole H.

Figure 8:
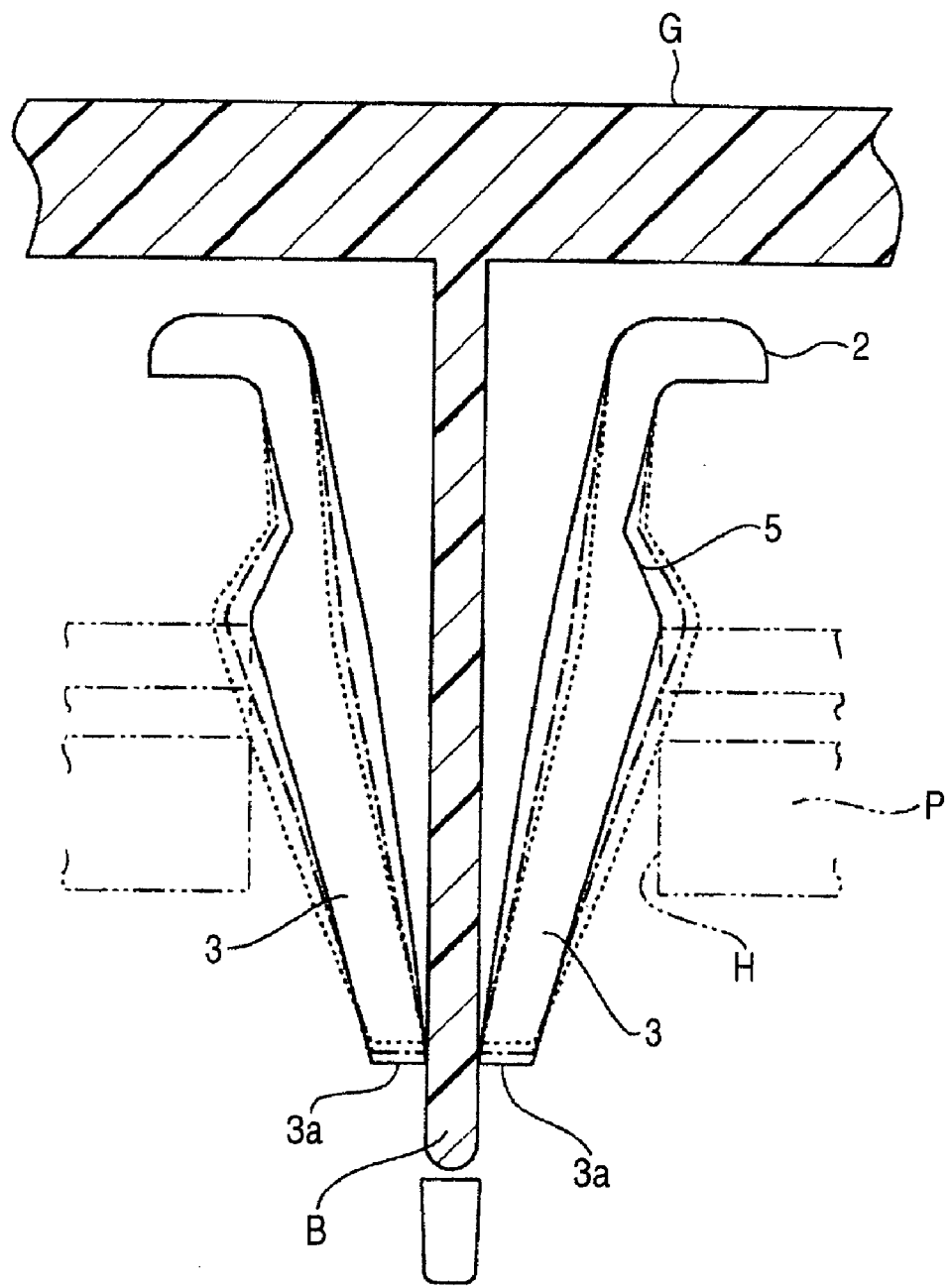
FIG. 8 is an explanatory view showing the fixing structure in a state where elastic locking legs are pressed by a hole edge of an attaching hole in the vehicle panel.

Specifically, in this embodiment, in case where the clip C fitted to the boss member B is inserted into the attaching hole H of the vehicle panel P, the pair of the elastic locking legs 3 are pushed by the hole edge of the attaching hole H to pass it through, irrespective of the thickness of the contact portion 8a of the boss member B, as shown in FIG. 8. In this embodiment, because the center lines of the thickness of the elastic locking legs 3 are outwardly curved, the elastic locking legs 3 will be pushed by the hole edge of the attaching hole H when the clip C is inserted into the attaching hole H, and will be deformed from the curved shape to the rectilinear shape thereby to downwardly extend the lower ends 3a which are the free ends. In this manner, inserting operation with respect to the attaching hole H has become easier, irrespective of the thickness of the boss member B.

Figure 9:
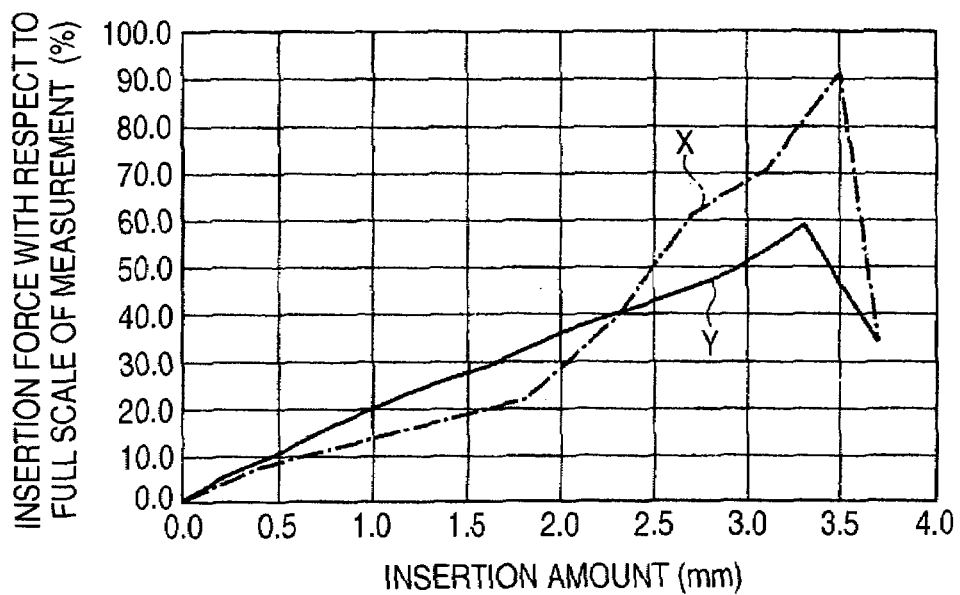
FIG. 9 is a graph showing results of analysis which has been made concerning insertion force and insertion amount.

This will be explained referring to a graph in FIG. 9 in which insertion force and insertion amount of the elastic locking leg 3 in a curved shape have been analyzed in comparison with the elastic locking leg in a rectilinear shape. The elastic locking leg in the rectilinear shape will contract the lower end 3a, which is the free end, upwardly, while it is deformed from the rectilinear shape into an inwardly curved shape, and accordingly, requires, as apparent from a line X, the largest insertion force of 90% of a full scale of measurement, as a value measured by a clip insertion force measuring instrument. On the contrary, the elastic locking leg 3 in the curved shape will extend the lower end 3a, which is the free end, downwardly, while it is deformed into the rectilinear shape, and the largest insertion force of 59% would be sufficient. As the results, the insertion force can be reduced by about 44.4% of the full scale of the measurement. An equation $(90-59) \div 59 = 53\%$ means that the insertion force can be reduced to almost a half. Therefore, in the first embodiment, irrespective of the thickness of the boss member B, insertion performance into the attaching hole H has become extremely favorable.

The fixing member employed in the first embodiment is a fixing member for fixing, for example, a vehicle part such as a trim board for a car to a vehicle panel, utilizing a boss member provided at and extended from a back face of the vehicle part. The fixing member is integrally formed of synthetic resin. The fixing member has a U-like shape in a cross section. The fixing member 1 has a base portion 1 that includes opening portion at side surfaces thereof, a pair of flange portions 2 that protrudes outwardly from a free end portion of the base portion, an elastic portion 3 that perpendicularly extending from a lower surface of each flange portion toward within the opening portion of the base portion, and two pair of engagement portions 4 that protrude from inner surfaces of the base portion. The inner surfaces of the base portion are opposed to with each other. The base portion of the fixing member is inserted into an attaching hole which is previously provided with the vehicle panel, while the fixing member is engaged with a boss portion which is previously provided with the back surface of the vehicle part, so that the vehicle panel is pinched by the flange portions and the elastic portion. Thus, the vehicle part is fixed to the vehicle panel. When the fixing member is engaged with the boss portion of the vehicle panel, one pair of the elastic portion presses both sides of the boss portion by its distal end portion of the elastic portion, so that a thickness of the boss portion can control a position of the distal end portion of the elastic portion. Accordingly, the fixing member can control an angle that the fixing member is engaged with the inserting hole of the vehicle panel and also control a degree of the engagement.

Second Embodiment

Figure 10A:
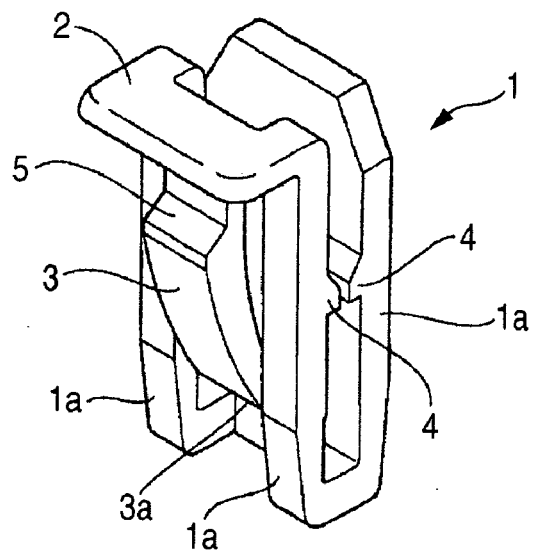
FIG. 10(A) is a perspective view of a clip employed in a second embodiment of the invention, and (B) is a front view of the same.
Figure 10B:
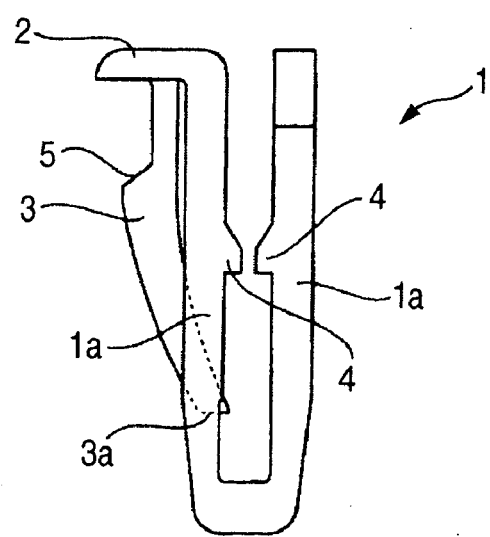
Figure 11A:
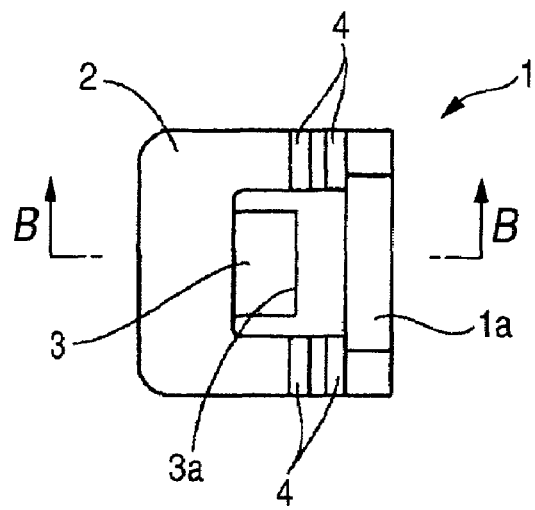
FIG. 11(A) is a plan view of the clip employed in the second embodiment, and (B) is a sectional view taken along a line B-B in FIG. 11(A).
Figure 11B:
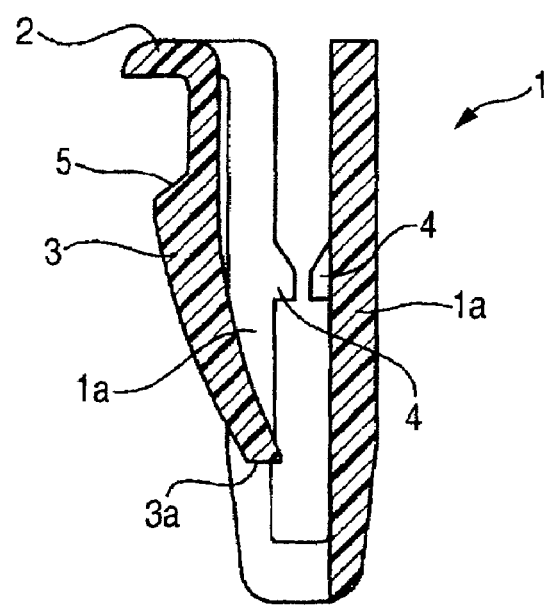

Then, a fixing structure in a second embodiment will be described. In the second embodiment, the fixing member (hereinafter referred to as a clip C) has been modified. As shown in FIGS. 10 and 11, a flange portion 2 (hereinafter referred to as a flange 2) is continuously formed at only one of opening end edges of a U-shaped main body 1, and an elastic portion 3 (hereinafter referred to as an elastic locking leg 3) of which a base end is integrally suspended from a lower face of the aforesaid flange 2 and a lower end 3a is a free end is provided in a center part of one of side walls 1a where the flange 2 is provided. However, four engaging claws 4 (hereinafter referred to as engaging protrusions 4) to be engaged with the engaging holes 7 of the boss member B are provided, in the same manner as in the first embodiment, on both an inner face of one of the side walls 1a where the elastic locking leg 3 is not provided and on a corresponding inner face of the other side face 1a.

More specifically, the fixing member employed in the second embodiment is a fixing member for fixing, for example, a vehicle part such as a trim board for a car to a vehicle panel, utilizing a boss member suspended from a back face of the vehicle part. The fixing member is integrally formed of synthetic resin. The fixing member has a U-like shape in a cross section. The fixing member has a base portion 1 that includes opening portion at one side surface thereof, a flange portion 2 that protrudes outwardly from a free end portion of which the base portion has the opening portion, an elastic portion 3 that perpendicularly extending from a lower surface of flange portion toward within the opening portion of the base portion, and two pair of engagement portions 4 that protrude from inner surfaces of the base portion. The inner surfaces of the base portion are opposed to with each other. The base portion of the fixing member is inserted into an attaching hole which is previously provided with the vehicle panel, while the fixing member is engaged with a boss portion which is previously provided with the back surface of the vehicle part, so that the vehicle panel is pinched by the flange portions and the elastic portion. Thus, the vehicle part is fixed to the vehicle panel. When the fixing member is engaged with the boss portion of the vehicle panel, one pair of the elastic portion presses both sides of the boss portion by its distal end portion of the elastic portion, so that a thickness of the boss portion can control a position of the distal end portion of the elastic portion. Accordingly, the fixing member can control an angle that the fixing member is engaged with the inserting hole of the vehicle panel and also control a degree of the engagement.

Therefore, in the second embodiment too, in case where the car interior material G is attached to the vehicle panel P, the boss member B projected from the back face thereof is inserted into the U-shaped main body 1 of the clip C, and the four engaging protrusions 4 are engaged with the corresponding engaging holes 7 from the both sides, thereby to rigidly fix the clip C itself to the boss member B in a stabilized manner. At the same time, the lower end 3a of the one elastic locking leg 3 comes into contact with the contact portion 8a of the boss member B, and detects the thickness of the contact portion 8a, thereby to change an opening angle of the inclined shoulder 5 of the one elastic locking leg 3.

Figure 12:
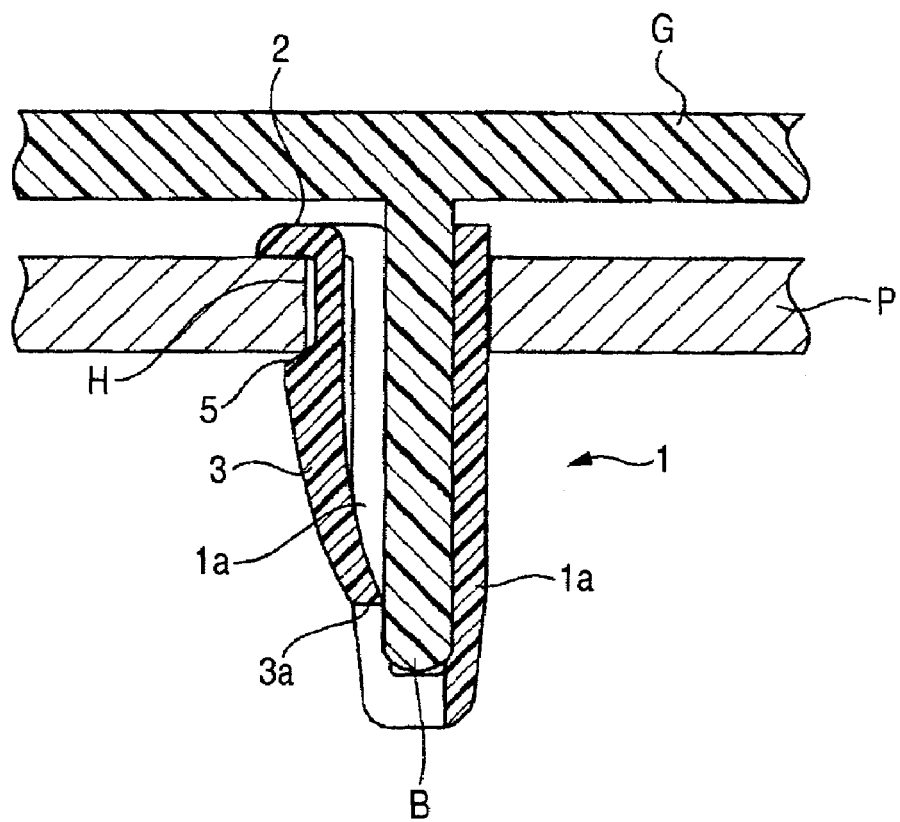
FIG. 12 is a sectional view showing the fixing structure in the second embodiment in a state where the car interior material has been fixed to the vehicle panel.

Thereafter, the clip C in this state is inserted into the attaching hole H in the vehicle panel P, while the one elastic locking leg 3 is inwardly flexed, and the hole edge of the attaching hole H will be elastically locked to the inclined shoulder 5 of the elastic locking leg 3, as shown in FIG. 12. In this manner, the car interior material G can be fixed to the vehicle panel P by one-touch operation. Particularly, in this case, the elastic locking leg 3 will be locked to the hole edge of the attaching hole H, while the opening angle of the inclined shoulder 5 of the elastic locking leg 3 is changed according to the thickness of the contact portion 8a of the boss member B. Consequently, the required anti-detaching force can be obtained, as desired, in the same manner. Descriptions of other structures and operational effects will be omitted here, because they are substantially the same as in the first embodiment.

INDUSTRIAL APPLICABILITY

In the fixing structure and the fixing member for the car interior material according to the invention, when the lower end of the elastic locking leg comes into contact with the boss member of the car interior material, the elastic locking leg will detect the thickness of the contact portion and change the opening angle of the inclined shoulder thereof. In this manner, the locking force of the inclined shoulder of the elastic locking leg with respect to the hole edge of the attaching hole can be controlled according to the thickness of the contact portion of the boss member. As the results, the fixing structure will be highly suitable, especially in case where a garnish or the like for a car which requires a large anti-detaching force is attached to a vehicle body.

What is claimed is:

1. A fixing member that fixes a vehicle part to a vehicle panel, said vehicle part having a boss member that extends from a back surface of the vehicle part through an attaching hole in the vehicle panel, said fixing member comprising:
   a base portion having side surfaces, an opening in at least one of said side surfaces, free end portions at an upper end of said base portion, and opposing inner surfaces that have corresponding opposed engagement portions;
   at least one flange portion extending outwardly from at least one of said free end portions; and
   at least one elastic portion that extends downward from a lower surface of said at least one flange portion toward a distal end portion of the at least one elastic portion, and is positioned within said opening of said distal end portion,
   wherein said base portion is positioned in said attaching hole such that the boss member is positioned between the opposing inner surfaces of the base portion and is engaged by said opposed engagement portions such that the boss member presses against said distal end portion of said at least one elastic portion, to generate a pinching force between said at least one flange portion, said at least one elastic portion, and said attaching hole of said vehicle panel, and further wherein a thickness of said boss portion controls a position of said distal end portion in order to control an angle and a degree of engagement between the fixing member and the vehicle panel.

2. A fixing member for a car interior material which fixes the car interior material to a vehicle body, by engaging a boss member formed on a back face of the car interior material with an attaching hole formed in the vehicle body, by a clip including a U-shaped main body having a pair of opposing side walls and opening end edges, and a flange continuously provided from one of the opening end edges of the U-shaped main body,
   the U-shaped main body being provided, in a center part of one of the side walls thereof which define the U-shape, with at least one elastic locking leg of which a base end is integrally suspended from the flange and a lower end is a free end, and
   the U-shaped main body being provided with engaging protrusions opposed to each other, respectively on an inner face of the one side wall where the at least one elastic locking leg is not provided and on a corresponding inner face of the other side wall,
   wherein an inclined shoulder is formed on an outer face of the elastic locking leg in an outwardly protruded shape so as to be locked to a hole edge of the attaching hole of the vehicle body, and wherein the boss member of the car interior material includes engaging recesses which are adapted to be engaged with the engaging protrusions.

3. The fixing member according to claim 2, wherein a center line of a thickness of the at least one elastic locking leg is outwardly curved.

4. The fixing member according to claim 2, wherein an outer edge of the lower end of the at least one elastic locking leg is positioned inwardly than an outer face of the side wall which defines the U-shaped main body.

5. The fixing member according to claim 2, wherein an inner edge of the lower end of the at least one elastic locking leg is positioned inwardly than an inner face of the side wall which defines the U-shaped main body.

6. The fixing member according claim 2, wherein the engaging protrusions are formed on inner surfaces of the side walls which define the U-shaped main body, and
wherein the engaging protrusions are engaged with corresponding engaging recesses at four corners of both faces of the boss member of the car interior material.

7. The fixing member according to claim 2, wherein the car interior material includes a plurality of the boss members, and
wherein a thickness of a portion of the boss member with which the lower end of the at least one elastic locking leg is contacted is larger in one of the boss members than in the other boss members.

8. The fixing member according to claim 2, wherein there are a plurality of the car interior materials, and
wherein a thickness of a portion of the boss member with which the lower end of the elastic locking leg is contacted, in one of the car interior materials, is larger than a thickness of a portion of the boss member which the lower end of the elastic locking leg is contacted with, in the other car interior materials.

* * * * *